INVENTORS
Edwin D. Simmons
Fumio F. Sako
Daniel J. Seidel
Tom H. Forrest

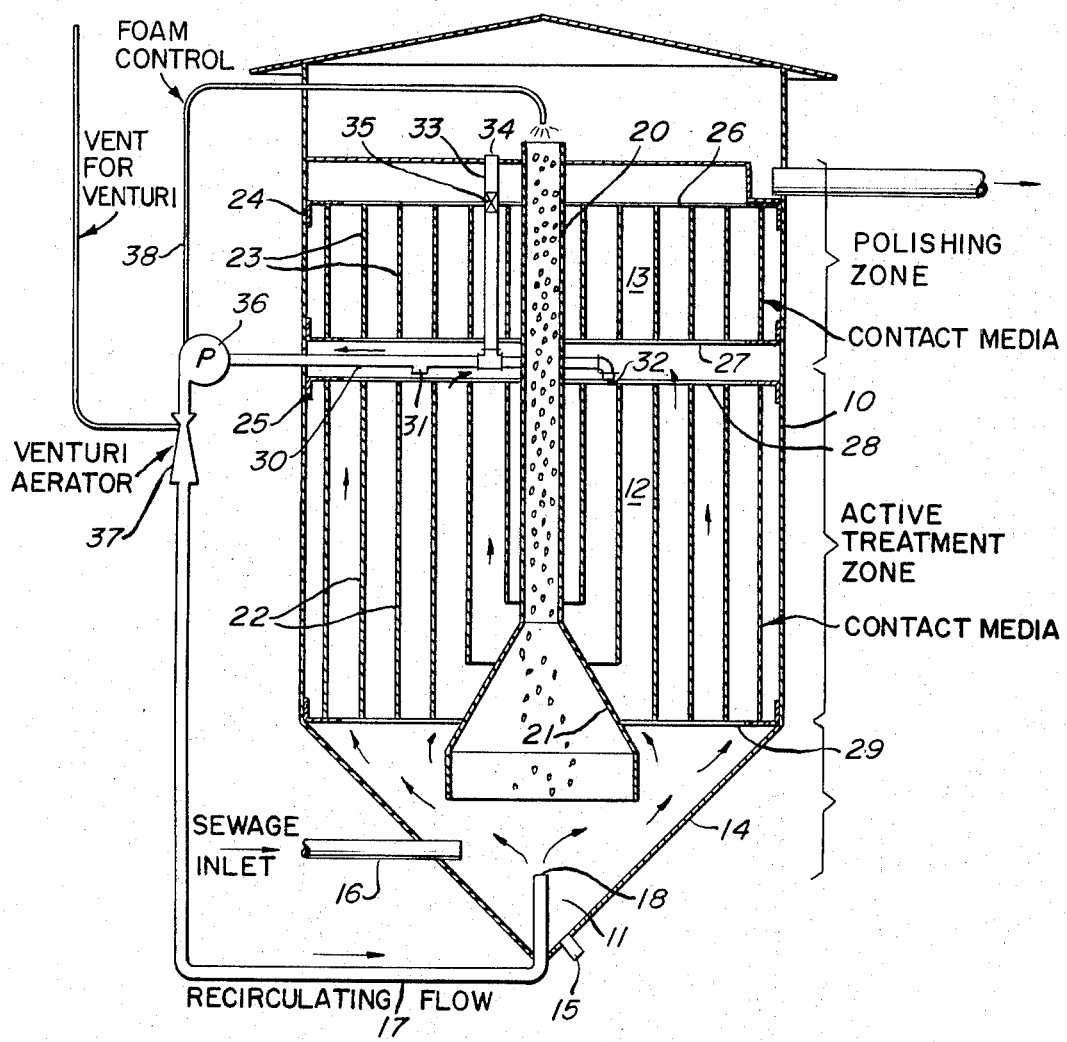

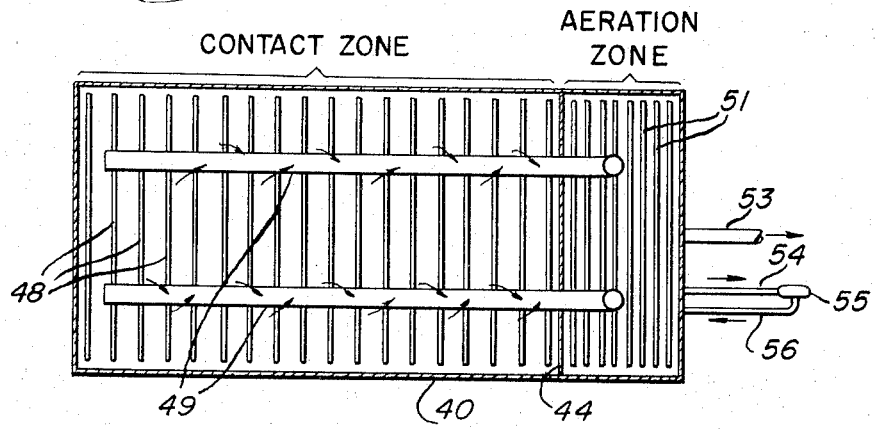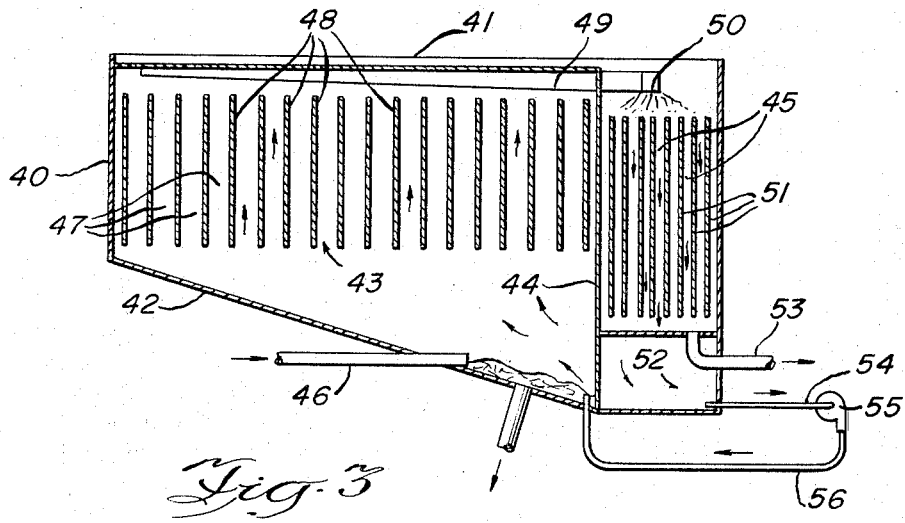

BY Dressler, Goldsmith, Clement, Gordon & Lord
ATTORNEYS

3,371,033
METHOD OF TREATING SEWAGE AND APPARATUS THEREFOR

Edwin D. Simmons and Fumio F. Sako, San Jose, and Daniel F. Seidel, Santa Clara, Calif., and Tom H. Forrest, Evanston, Ill., assignors to FMC Corporation, a corporation of Delaware
Filed Aug. 11, 1965, Ser. No. 478,866
10 Claims. (Cl. 210—3)

This invention relates to treatment of sewage. More particularly, it relates to a method of treating sewage wherein the complete treatment may be effected in a single processing unit. Still more particularly, it relates to a method wherein organic wastes are mixed with mediums having a high dissolved oxygen content and the mixture brought into contact with aerobic organisms supported on surfaces defining a plurality of flow courses.

In accordance with this invention, incoming waste is introduced into a mixing zone where it is admixed with a highly aerated liquor. The mixture then flows through a zone having contact media submerged therein which consists of spaced surface material having biological growth thereon, flow of the mixture within the tank bringing material into contact with the biological growth whereby elimination of biochemical oxygen demand is fostered. Liquor issuing from this contact zone is subjected to treatment to incorporate a high level of dissolved oxygen as well as to entrain oxygen containing gas. This aerated liquor, acting as a carrier for the required amounts of dissolved oxygen is recirculated either to the mixture in the mixing zone or is mixed with influent sewage as it enters the mixing zone.

Sewage systems generally depend upon an aerobic biological treatment in which the sewage is in contact with organisms capable of growing in the media and of eliminating the biochemical oxygen demand.

In the activated sludge type system, contact of organisms with waste is brought about by mixing sewage with sludge, i.e., a concentrate of solids containing flocs of organisms, to form a mixed liquor and then subjecting the mixture to strong agitation while introducing large volumes of air. In such systems as a trickling filter, the biological organisms are not present in or submerged in an aqueous medium but are present in the form of exposed growth on the surface of suitable base objects in contact with the atmosphere and reaction is brought about by flowing the waste in relatively thin streams in direct contact with the biological slimes. All of these waste systems require development of biological growth followed by a sedimentation to accumulate and to remove from the system solids which would eventually overload the treatment system.

Interest more recently has been directed to simplified treatment systems which eliminate a major portion of the B.O.D. of the influent stream and effect degradation of the solids so that sludge settling and sludge wasting operations are minimized.

Now it has been discovered that sewage may be processed for relatively complete removal of B.O.D. while effecting a marked reduction in sludge handling requirements, when raw sewage, which may have been degritted, screened and/or comminuted, is introduced into a zone for mixing with liquid, which liquid has been moved outside of said zone for processing in a manner such that, upon return to the mixing zone, the liquid carries with it not only dispersed oxygen containing gas but also the dissolved oxygen necessary for the reaction whereby, upon contact with biological organisms supported by spaced baffle units, the biological oxygen demand will be reduced.

The method of treating sewage according to this invention comprises introducing sewage into a mixing zone containing liquid at a point remote from the liquid outlet to form a main body of liquid, withdrawing any sludge to be wasted from said mixing zone, flowing the main body of liquid through a contact zone wherein the mixture is at least brought into close proximity with biologically active surface, withdrawing liquid from said main body in volumes greatly exceeding the volume of incoming sewage, discharging a volume of effluent from the system approximately equal to the volume of influent sewage, aerating the additional volumes of said withdrawn liquid to form an oxygen carrier with a minimum oxygen content of about 3 p.p.m. and returning the aerated liquid to the main body of liquid.

Apparatus for carrying out the above process comprises a container for holding a mixture of sewage and liquid, means for introducing sewage into said container, discharge means for liquid positioned remote from said means for introducing sewage, panel means positioned in a zone intermediate the top and bottom of said container dividing the container into a multiplicity of flow courses, means for segregating a portion of said mixture of said sewage and liquid, means such as gas dispersers for introducing oxygen-containing gas into said segregated portion of said mixture, means for introducing aerated mixture into the main body of liquid in said container, and means for wasting sludge accumulating in the bottom of said container.

Liquid to be aerated is withdrawn from the contact zone from a point removed from the liquid inlet, usually in a volume in the range between about five and about twenty times the volume of influent sewage, preferably ten to fifteen times the influent sewage volume. Either before or after aeration, this withdrawn treated effluent is separated into two portions, a recycle portion and a portion which is discharged from the system.

Liquid enriched with dispersed and dissolved oxygen, is returned to produce, with the influent sewage, a highly aerated mixture capable of entering into a reaction for the fast reduction of B.O.D. when the mixture contacts submerged biological medium adhering to divider surfaces segregating the central portion of the contact zone into a multiplicity of flow courses bounded by biological slime coated surfaces.

More in detail, in a preferred mode of operation, the process involves introduction of sewage, preferably comminuted, into a treatment zone having an inlet portion where complete mixing takes place. The completely mixed influent and recirculated material is passed through a segmented central portion where the mixture contacts biological slimes and is then commingled in an outlet portion as a treated liquor.

In this contact zone, a minimum content of dissolved oxygen of three parts per million (p.p.m.) should be maintained, preferably, the dissolved oxygen should exceed about half the saturation value at the temperature of treatment which saturation value is about 10 p.p.m. at 15° C. (50° F.).

If the oxygen absorbed from the air during the aeration operation is not sufficient to maintain the oxygen level due to periodic overload of B.O.D., air may be periodically dispersed into the liquid being converted to a suitable oxygen carrier by suitable means so that oxygen may be carried into the contact zone in the form of dispersed gases as well as dissolved oxygen.

Sewage introduced into the zone may be either raw domestic or raw industrial waste with or without primary settling.

Elimination of B.O.D. requires that the effluent sewage have available to it an adequate supply of dissolved oxygen at the time it is in contact with biological slimes.

Dissolved oxygen may be made available by accumulating aerated recycled material and mixing it with influent sewage just before or as it enters the mixing zone or by mixing influent sewage with aerated liquor in the inlet portion of the treating zone which is being continuously supplied with aerated recirculated liquid.

Treatment of the mixture of sewage and aerated liquor takes place, as it flows between biological slime coated surfaces, the agitation of the flow bringing about a contact between the sewage and material which catalyzes the oxygen consuming reaction, thereby eliminating the B.O.D.

The biological slime coated units include a plurality of elements which are maintained in a generally spaced relationship, although they are not necessarily rigidly fixed and, consequently, may or may not exhibit some movement in response to the movement of sewage mixture through the treatment zone. The spacing of the surfaces between which the sewage mixture flows is subject to considerable variation and is generally based upon the surface area required to support the quantity of biological organisms which are needed to effect the reaction based upon the presence of organisms and oxygen in the streams flowing between the slime coated divider surfaces.

After flow through the biological slime coated units, i.e., between the panels on which the biological slimes form a surface coating, the liquid or at least a major part thereof is withdrawn for aeration. Aeration may be accomplished in various ways as by passing the liquid through a venturi tube adapted with an air vent communicating with the point of low pressure so that air is drawn in and mixed with the flowing liquid, by spraying the liquid into the atmosphere, by flowing the liquid in thin films over surfaces, injecting air into a draft tube used to circulate liquid in a tank, and the like. After aeration, the liquid is returned as an oxygen carrier, thus making available oxygen, necessary for reaction when the sewage mixture contacts biologically active surfaces. Contacting of the mixture of oxygen carrier and sewage with biologically active surface, may be accomplished in one or more stages with liquid to be recirculated being withdrawn after, for example, complete treatment in two stages or being withdrawn from an area intermediate the two contacting zones.

Divider surfaces segregating the treatment zone into a multiplicity of flow courses may be formed of suitable bases, for example, individually suspended filaments, latticeworks, woven mats, panels, sheets, plates of smooth or corrugated configuration, etc., made up of wood, metal, plastics, fabrics, and the like. Preferably, the panels are formed of an acrylic resin material such as "Dynel" which consists of a reaction product of vinyl chloride and acrylonitrile, available commercially as sheets, filaments, or fabrics, because such acrylics apparently have an attraction for biological slime, provide a base to which the slimes tenaciously adhere and do not deteriorate in sewage.

The invention will be more fully understood by reference to the drawings which illustrate various embodiments of the invention and wherein:

FIGURE 1 is a side elevational view of a round tank having two treatment zones arranged for removal of recirculation liquid between the treatment zones;

FIGURE 2 is a top plan view of a rectangular tank with an aeration zone at one end thereof;

FIGURE 3 is a side elevational view of the rectangular tank illustrated in FIGURE 2;

Figure 4:
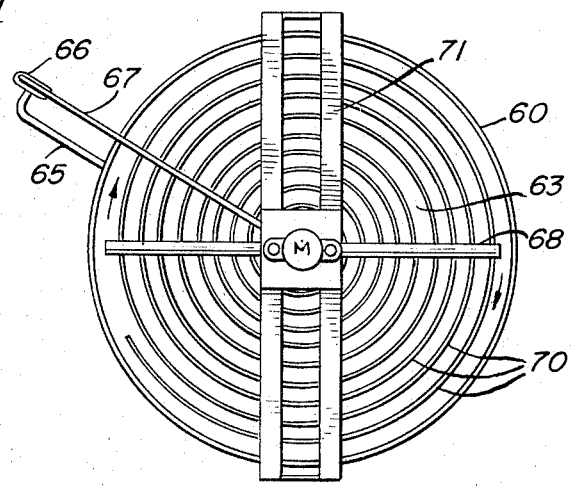
FIGURE 4 is a top plan view of a tank adapted with aeration by flowing the liquids over surfaces in their film form exposed to atmospheric air.

In the drawings, in FIGURE 1, the numeral 10 indicates a tank in which there is a sludge accumulation zone 11, a contact zone 12 for accomplishing a major portion of the treatment and a finishing or polishing zone 13 where B.O.D. removal is completed.

The sludge accumulation zone is bounded by the bottom portion of cone bottom 14 of tank 10. Sludge is removed from zone 11 through outlet pipe 15. Sewage is introduced into tank 10 through influent pipe or pipes 16. Recirculation liquid is introduced into tank 10 through pipe 17 with outlet 18 positioned at the vertical central axis of the round tank.

Centrally positioned within tank 10 is a chimney 20 with enlarged bottom portion 21 which extends downwardly below the bottom of contact zone 12.

Sewage mixed with recirculation liquid introduced through pipe 17 and liquid flowing downwardly and issuing from the chimney 20, flows upwardly outside the chimney and through spaced contact zones 12 and 13. Each zone is provided with panel or surface units, designated 22 and 23. Since the arrangement of the panels within each zone may be the same except for spacing, a detailed description of one unit will suffice for illustration purposes.

Units 22 and 23 are supported by brackets 24 and 25, respectively. Each unit includes a plurality of circular panels which are maintained in spaced relationship by being secured at the top and bottom to frames 26 and 27, and 28 and 29 respectively, by suitable means such as nails, screws, brackets or other suitable means.

Positioned intermediate the spaced contact zones 12 and 13 is a liquid conduit 30 having inlets thereto designated 31 and 32. Liquid conduit 30 is provided with a branch pipe 33 with inlet 34 thereto extending to the top of contact zone 13. Flow in branch pipe 33 is controlled by valve 35 so that liquid may or may not be withdrawn from the top of the tank 10, as desired.

Conduit 30 communicates with a liquid pump 36. Liquid discharged by pump 36 passes through a venturi aerator 37 and then through pipe 17 for reintroduction into the tank 10. A portion of the liquid discharged from pump 36 is diverted through pipe 38 for spray as a foam control and to carry foam and associated material down the chimney 20 for mixing with sewage and thus be further treated.

In FIGURES 2 and 3, the numeral 40 indicates a rectangular tank closed at the top by a cover 41 and adapted with a sloping bottom 42 for the contact zone 43. Tank 40 is divided by a partition 44 into the contact or sewage treatment zone 43 and a liquid aeration zone 45.

Sewage enters tank 40 through influent conduit 46. After mixing with recycled liquid acting as an oxygen carrier, the sewage mixture flows upwardly through spaced contact zones 47 formed between panels 48. Liquid ascending to the top of contact zone 43 overflows weirs into troughs 49.

Troughs 49 have outlets 50 thereof positioned in the top of aeration zone 45. Liquid distributed by these outlets flows as thin films over fabric panels 51 and a portion thereof is collected in zone 52. Zone 45 is provided with an outlet conduit 53 through which a second portion of the liquid is discharged.

Liquid is withdrawn through line 54 from zone 52 by pump 55 and returned to treatment zone 43 through pipe 56.

Figure 5:
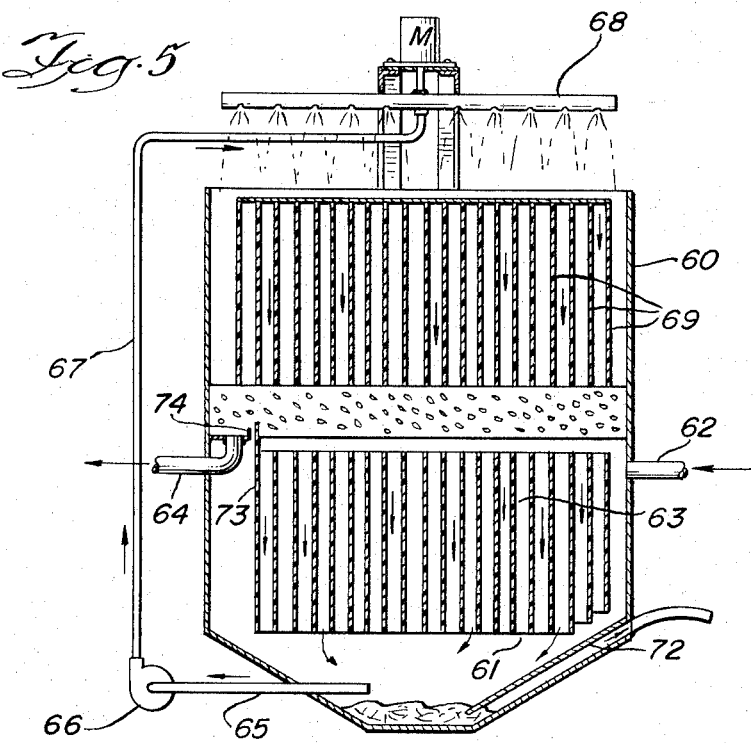
FIGURE 5 is a side elevational view of apparatus illustrated in FIGURE 4.

In FIGURES 4 and 5, there is represented a tank arrangement with the aerating section positioned directly above a treating zone with submerged contact media so that the recycle returns as droplets of aerated liquid dropping directly into the treating zone.

In these figures, the numeral 60 indicates a tank in which there is an influent mixing zone 61 for sewage entering through conduit 62 and a contact zone 63. Liquid is discharged from contact zone 63 through pipe 64. A further portion of the liquid in contact zone 63 is withdrawn through pipe 65. A pump 66 receiving liquid through pipe 65 delivers liquid through pump outlet pipe 67 to a rotatable distributor arm 68.

Distributor arm 68 rotates in a horizontal plane above the top of concentric rows of filamentous material 69. The filaments are preferably synthetic fibers such as Saran, Dynel, etc. Filaments 69 are supported by circular hoops 70 suspended by brackets 71 secured to the top of tank. These filaments have a spaced position such that free fall of liquid to the tank below without contacting a surface is minimized. Distributor arm 68 is adapted with suitable ports through which the liquid flows by gravity onto the filaments 69. Liquids flowing along filament 69 in thin film form are aerated and the resulting aerated liquid carrier flows in droplet form into the contacting zone of tank 60. Sludge accumulated in the bottom of tank 60 is removed through conduit 72. Treated liquid rises behind the baffle 73, overflows a weir 74 and is discharged from the system through pipe 64.

Figure 6:
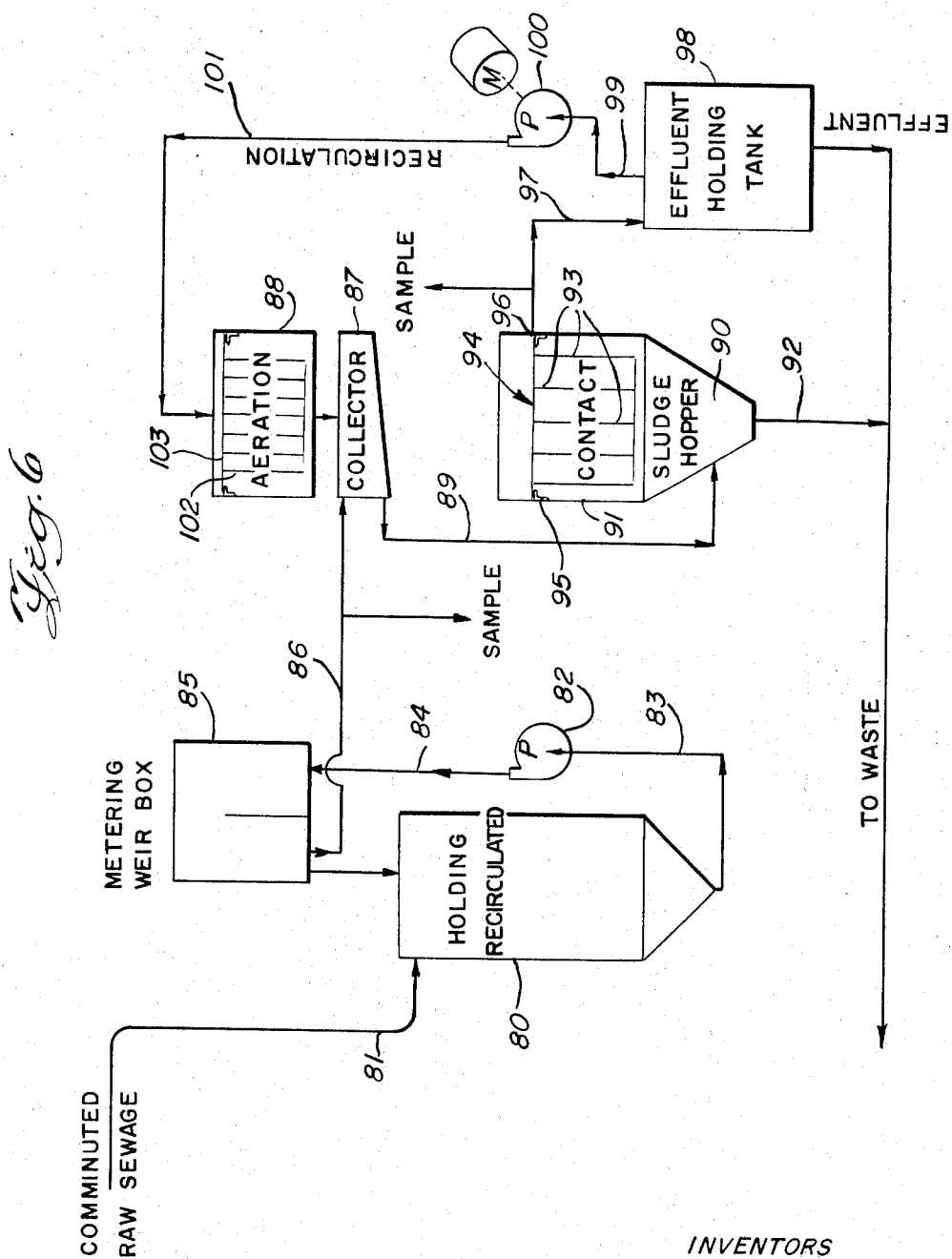
FIGURE 6 is a schematic view of a complete system for treating sewage utilizing the apparatus of this invention as the sewage treatment unit.

In FIGURE 6, comminuted raw sewage is introduced for accumulation into a surge tank 80 through pipe 81. A pump 82 receives sewage through intake pipe 83 and moves it through discharge pipe 84 to a metering weir box 85. Sewage flows in metered amounts from box 85 through conduit 86 to a collector pan 87. Collector pan also receives liquid from aeration unit 88.

The combined liquids flow through conduit 89 to the hopper portion 90 of tank 91. Tank 91 discharges sludge to waste through outlet pipe 92. In tank 91, the liquid mixture flows upwardly between the biological slime covered panels 93 of unit 94. Unit 94 is supported in tank 91 by flanges 95.

Tank 91 is provided with an outlet 96. Liquid discharging through outlet 96 flows through pipe 97 to an effluent holding tank 98. Effluent is removed from tank 98 by pump 100 through pipe 99 and discharged through pipe 101 to a distributor element for feeding recycle liquid to aeration tank 88.

Aeration tank 88 has filaments 102 suspended therein supported by rods 103 which extends across the tank and are supported by the top of the aeration tank walls. Liquid flows over the filaments 102 in thin film form and fall as droplets to the collector 87.

When operating the process described in FIGURE 6 at a sewage influent rate of 4 gallons per minute and with a recycle stream of 70 gallons per minute, sewage containing 200 mg. per liter produces without contact media in tank 91 a five day B.O.D. of 50 mg./liter and with contact media in tank 91, a five day B.O.D. of 10 mg./liter.

The above detailed description of this invention has been given by way of illustration without any intention that the invention be limited to the exact conditions set forth. No unnecessary limitations should be understood therefrom as modifications will be obvious to those skilled in the art.

We claim:

1. Apparatus for treating sewage which comprises a container closed at the top capable of holding a mixture of sewage and liquid, means for introducing sewage into said container, discharge means for liquid positioned remote from said means for introducing sewage, vertically spaced surface means positioned in a zone intermediate the top and bottom of said container, said surface means dividing the container into a multiplicity of substantially vertical flow courses, means positioned intermediate said spaced surface means for withdrawing a portion of the mixture flowing through said container to a zone outside said container, means for introducing oxygen-containing gas into said withdrawn mixture to form an oxygen-carrier liquid, means for introducing the oxygen-carrier liquid into said container at a point below said surface means and means for wasting sludge from said container.

2. Apparatus for treating sewage which comprises a container for holding liquid, means for introducing sewage into said container, discharge means for liquid positioned remote from the means for introducing sewage, surface means presenting a surface of biologically active aerobic organisms positioned in a zone intermediate the top and bottom of said container and dividing the area into a multiplicity of substantially vertical flow courses, means for segregating a portion of said mixture of sewage and liquid, pumping means positioned with inlet adapted to receive segregated liquid mixture, liquid distributing means connected in liquid receiving relationship to said pumping means and positioned above the liquid level in said container, said liquid distributing means being rotatable in a horizontal plane, filamentous material positioned intermediate said distributing means and said container and terminating above the liquid level in said container whereby the distributed liquid flows in thin films in contact with the atmosphere for absorption of oxygen, and means for wasting sludge from the bottom of said container.

3. Apparatus for treating sewage which comprises a container for holding liquid having an open top, surface means positioned in a zone intermediate the top and bottom of said container and dividing the area into a multiplicity of substantially vertical flow courses, means for segregating a portion of said liquid, pumping means positioned with inlet adapted to receive segregated liquid, liquid distributing means connected in liquid receiving relationship to said pumping means and positioned above the liquid level in said container, filamentous material positioned intermediate said distributing means and said container, said filamentous material being positioned directly above said container and terminating above the liquid level in said container whereby liquid droplets falling from said filaments move directly into the liquid in said container, means for introducing sewage into said container, means remote from said sewage inlet for discharge of treated liquid from said container and means for wasting sludge from the bottom of said container.

4. Apparatus for treating sewage which comprises a container for holding liquid having an open top, surface means positioned in a zone intermediate the top and bottom of said container and dividing the area into a multiplicity of substantially vertical flow courses, means for segregating a portion of said liquid, pumping means positioned with inlet adapted to receive segregated liquid, liquid distributing means connected in liquid receiving relationship to said pumping means and positioned above the liquid level in said container, filamentous material positioned intermediate said distributing means and said container and terminating above the top of said container, liquid collector means positioned intermediate the bottom of said filamentous material and the liquid level in said container, means for introducing sewage into said liquid collector means for mixing with aerated liquid collected therein, means for introducing mixture formed in said collector means into said container, means for discharge of treated liquid from said container positioned remote from the point of introduction of sewage-aerated liquid mixture, and means for wasting sludge from the bottom of said container.

5. A method of treating sewage which comprises establishing a treatment zone for an aqueous sewage wherein said treatment zone is divided in the vertical direction into spaced unobstructed areas separated by a contact area consisting of a multiplicity of upwardly directed flow courses of coextensive length, the boundaries of said flow courses being biologically active surfaces, mixing sewage with aerated liquid in the elevationally lower of said spaced unobstructed areas to form a main body of liquid for flow from said elevationally lower unobstructed area upwardly through said contact area, flowing said body of liquid through said flow courses in close proximity with said biologically active surfaces for elimination of B.O.D., commingling treated liquid after passing through said flow courses in the second of said unobstructed areas, discharging to waste a volume of treated liquid approximately equal to the volume of influent sewage, withdrawing additional treated liquid from the second of said unobstructed areas to an aeration zone outside said treatment zone, aerating the withdrawn liquid to form an oxygen carrier with a minimum oxygen content of about 3 p.p.m., introducing the aerated liquid to the elevationally lower of said spaced unobstructed areas for mixing to form the main body of liquid and wasting sludge from said container.

6. The method according to claim 5 wherein the minimum oxygen content of said oxygen carrier after aeration is in excess of half the saturation value at the temperature of the main body of liquid.

7. The method according to claim 5 wherein the aeration is accomplished by flowing withdrawn liquid in thin film form over surfaces in contact with air.

8. The method according to claim 5 wherein the contact area is split into spaced portions, an unobstructed area of commingling is between said spaced portions and withdrawal of liquid for aeration is from the area between said spaced portions of said contact zone.

9. Apparatus for treating sewage which comprises a container for holding a mixture of sewage and liquid, means for introducing sewage into said container, discharge means for liquid positioned remote from said means for introducing sewage, partition wall means positioned intermediate the top and bottom of said container which divides the container in the horizontal direction into a multiplicity of substantially parallel upwardly directed flow courses and divides the container in a vertical direction below the normal liquid level to provide spaced unobstructed zones, means for segregating from one of said unobstructed zones a portion of said mixture after passage of said mixture through said parallel flow courses and recombining as a uniform mixture, means external of said container for holding a mixture of sewage and liquid for contacting oxygen-containing gas with said segregated portion of said mixture to form a liquid carrier containing dissolved oxygen, means for introducing said liquid carrier containing dissolved oxygen into the liquid in the other of said unobstructed zones and means for wasting sludge from said container.

10. Apparatus for treating sewage which comprises a container of rectangular cross-sectional configuration, divider means separating said container into an aeration zone and a contact zone, partition wall means positioned intermediate the bottom of said contact zone and the liquid surface level normally maintained therein, said partition wall means dividing the contact zone into a multiplicity of substantially vertical flow courses, means for introducing sewage at a point below said partition wall means in said contact zone, means for segregating material which has passed between said partition wall means, means for delivering said segregated material to said aeration zone, wall means positioned in said aeration zone, said wall means dividing the aeration zone into a multiplicity of substantially vertical flow courses, means for directing flow of liquid over said wall means whereby said liquid moves in contact with oxygen containing gas and forms a liquid carrier containing dissolved oxygen, means for accumulating oxygen-carrier liquid at a point below said wall means in said aeration zone, means for discharging accumulated oxygen-carrier liquid from said aeration zone, means for introducing oxygen-carrier liquid from said aeration zone into said contact zone at a point below said partition wall means and means for wasting sludge from said container.

References Cited
UNITED STATES PATENTS

| | | | |
|---|---|---|---|
| 2,458,163 | 1/1949 | Hays | 210—9 X |
| 2,559,704 | 7/1951 | Bevan | 210—11 |
| 3,206,032 | 9/1965 | Nottingham et al. | 210—14 X |
| 3,232,434 | 1/1966 | Albersmeyer | 210—7 X |
| 3,238,124 | 3/1966 | Burton | 210—15 X |
| 3,269,542 | 8/1966 | Renzi et al. | 210—17 X |

OTHER REFERENCES

Imhoff, K., et al., Sewage Treatment, 1940, John Wiley, New York, pp. 144, 145, relied on, 150 and 161–163.

MICHAEL E. ROGERS, *Primary Examiner.*

MORRIS O. WOLK, *Examiner.*